(12) United States Patent
Breakwell

(10) Patent No.: US 8,858,180 B2
(45) Date of Patent: Oct. 14, 2014

(54) ANNULUS FILLER ELEMENT FOR A ROTOR OF A TURBOMACHINE

(75) Inventor: Ian S. Breakwell, Ripley (GB)

(73) Assignee: Rolls-Royce PLC, London (GB)

( * ) Notice: Subject to any disclaimer, the term of this patent is extended or adjusted under 35 U.S.C. 154(b) by 557 days.

(21) Appl. No.: 12/881,454

(22) Filed: Sep. 14, 2010

(65) Prior Publication Data
US 2011/0085914 A1    Apr. 14, 2011

(30) Foreign Application Priority Data

Oct. 14, 2009 (GB) .................................. 0917955.7

(51) Int. Cl.
F01D 5/30 (2006.01)
F01D 11/00 (2006.01)
F02C 7/04 (2006.01)

(52) U.S. Cl.
CPC .......... F01D 11/008 (2013.01); F05D 2220/36 (2013.01); F02C 7/04 (2013.01)
USPC .................................................... 416/193 A

(58) Field of Classification Search
USPC ........... 416/193 R, 193 A, 195, 214 R, 220 R
See application file for complete search history.

(56) References Cited

U.S. PATENT DOCUMENTS

| 4,478,554 | A  | * | 10/1984 | Surdi ............................ 416/221 |
| 6,634,863 | B1 |   | 10/2003 | Forrester et al. |
| 6,887,043 | B2 | * | 5/2005  | Dix et al. ........................ 416/94 |

FOREIGN PATENT DOCUMENTS

| GB | 2 363 170 A | 12/2001 |
| WO | WO 93/21425 | 10/1993 |

OTHER PUBLICATIONS

British Search Report dated Feb. 11, 2010 issued in British Patent Application No. 0917955.7.

* cited by examiner

Primary Examiner — Dwayne J White
Assistant Examiner — Christopher J Hargitt
(74) Attorney, Agent, or Firm — Oliff PLC

(57) ABSTRACT

An annulus filler element (40) for a rotor of a turbomachine, the annulus filler element (40) comprising: a lid portion (42) having a radially outwardly facing surface for forming an inner wall of a flow annulus of the rotor between adjacent blades (102) and a radially inwardly facing surface; and a nose cone attachment portion (52) integrally formed with the lid portion (42) for connection with a nose cone (122) of the turbomachine.

9 Claims, 2 Drawing Sheets

ANNULUS FILLER ELEMENT FOR A ROTOR OF A TURBOMACHINE

BACKGROUND

The present invention relates to an annulus filler element for a turbomachine, in particular for the bypass fan assembly of a turbo fan engine.

RELATED ART

A conventional turbo fan engine uses the core engine to drive a bypass fan mounted near the engine intake. Fan blades on the bypass fan drive a bypass flow around the core engine which combines downstream with the core exhaust flow to provide propulsive thrust.

A casing assembly extends around the outside of the fan to provide an outer wall of a flow annulus through the fan. The fan blades themselves are not normally provided with blade platforms, and so a number of separate circumferential wall inserts or "annulus fillers" are mounted on the outside of the fan rotor disc, in-between the fan blades, to form the inner wall of the flow annulus through the fan.

The annulus fillers are typically mounted on the fan rotor disc using a hook arrangement, such as the one described in International Application PCT/GB93/00372 (published as WO93/21425). Here, each annulus filler is provided with a pair of hooks which extend radially inwardly from the filler to engage correspondingly shaped hooks provided on the outer face of the fan rotor disc.

A similar configuration is shown in FIG. 1. A blade 2 is connected to a disc 4 at a radially outer face of the disc 4 by an interlocking configuration, such as a dovetail joint. A plurality of blades 2 are assembled onto the disc 4 around the circumference of the disc 4 to form a rotor. As described previously, an annulus filler 6 is provided between adjacent blades 2 so as to form the inner wall of the flow annulus through the fan. The annulus filler 6 is mounted to the disc by a pair of annulus filler hooks 8, 10 which engage with correspondingly shaped disc hooks 12, 14. The hook arrangement provides radial retention of the annulus filler 6 against centrifugal loads experienced during operation of the rotor. A plurality of annulus fillers 6 are provided, one between each pair of adjacent blades 2. To ensure that the annulus filler hooks 8, 10 are maintained in engagement with the disc hooks 12, 14, the axial position of the annulus filler 6 with respect to the disc 4 is fixed by a nose cone support ring 16. The nose cone support ring 16 covers the full circumference of the rotor and retains each of the annulus fillers 6. The nose cone support ring 16 is connected to an arm 18 of the disc and also to an arm 20 of the annulus filler 6. Consequently, the axial position of the annulus filler 6 is fixed so that the hooks remain engaged. During operation, the nose cone support ring 16 also bears a component of the centrifugal load of the annulus filler 6 which creates hoop stress in the nose cone support ring 16.

The nose cone support ring also functions as the primary fixation point for a nose cone of the turbomachine. The nose cone creates smooth airflow into the fan, particularly at the root of the blades, and also must be capable of withstanding bird strikes and preventing build up of ice. The nose cone 22 is located on an annular shoulder 24 of the nose cone support ring 16 and is connected at positions around the nose cone support ring 16 via abutting radial flanges 26.

The connection between the nose cone support ring 16 and the nose cone 22 is enclosed by a cover portion 28. The foremost axial end of the annulus filler 6 has a tongue portion 29 which is received under a lip portion 32 of the cover portion 28. A similar arrangement is provided at the opposite rearmost axial end, where a tongue 33 is provided for mating with a lip 34 of a rotating seal element 35.

The annulus filler 6, nose cone support ring 16, nose cone 22 and cover portion 28 must all be connected to one another which increases the assembly time and complexity. In addition, the connections increase the weight of the assembly and increase the risk of failure as a result of stress concentrations and misassembly of the components.

The present invention seeks to provide an improved annulus filler, and in particular seeks to provide an annulus filler assembly which addresses one or more of the specific problems referred to above.

SUMMARY

According to the present invention there is provided an annulus filler element for a rotor of a turbomachine, the annulus filler element comprising: a lid portion having a radially outwardly facing surface for forming an inner wall of a flow annulus of the rotor between adjacent blades and a radially inwardly facing surface; and a nose cone attachment portion integrally formed with the lid portion for connection with a nose cone of the turbomachine.

The integrally formed annulus filler element of the present invention provides a reduction in weight and also a reduction in assembly time.

The nose cone support portion may be conical.

The nose cone support portion may be provided with a circumferential locating ridge operable to locate the nose cone in a radial position.

The annulus filler element may further comprise a substantially radially extending flange integrally formed with the lid portion and nose cone attachment portion for connection with a disc of the rotor.

The flange may comprise a reference recess operable to locate the annulus filler element in a radial and axial position with reference to a complementary portion of the disc.

The flange may be connected to the disc.

The flange may comprise a balance tang for attachment of a balancing weight.

The flange may comprise a projection for retaining a slider of an adjacent blade.

The radially inwardly facing surface of the lid portion may have a hook extending therefrom for attachment to a disc of the rotor.

BRIEF DESCRIPTION OF THE DRAWINGS

For a better understanding of the present invention, and to show more clearly how it may be carried into effect, reference will now be made by way of example, to the following drawings, in which.

DETAILED DESCRIPTION OF EMBODIMENTS

Figure 1:
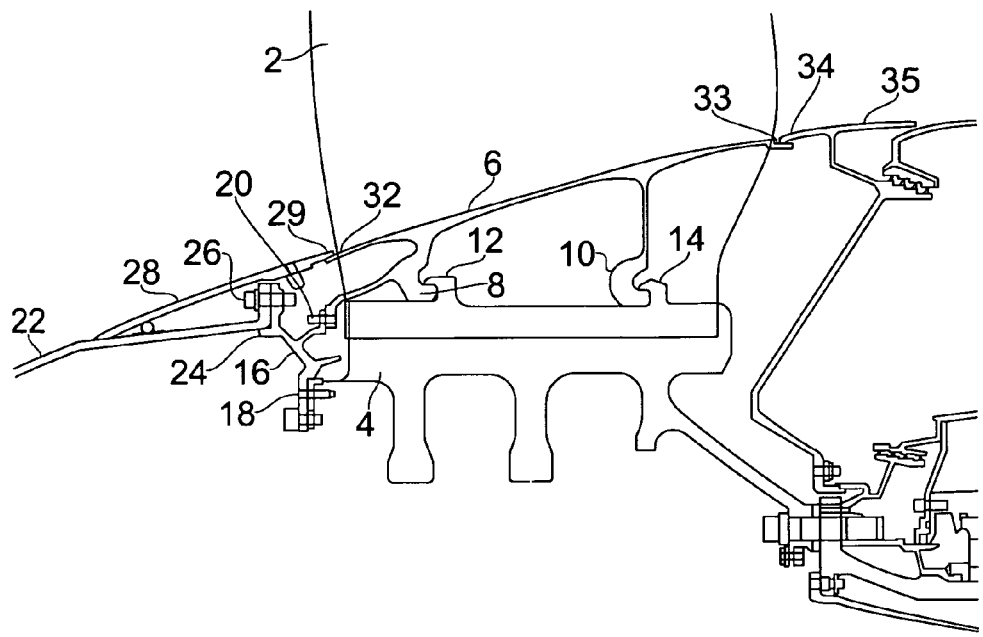
FIG. 1 is a side cross-sectional view of a prior art annulus filler.
Figure 2:
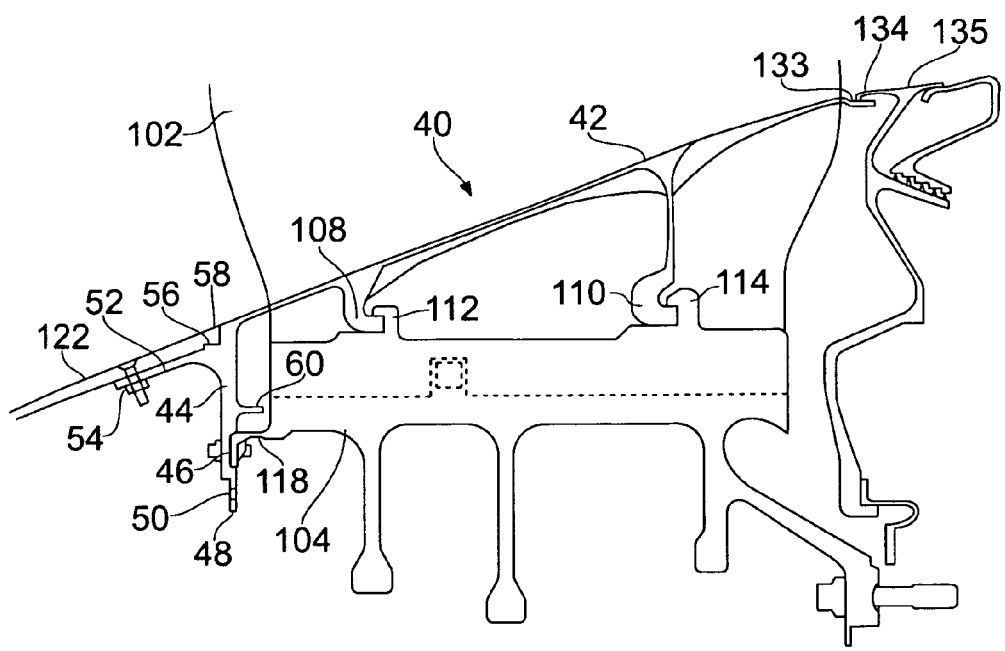
FIG. 2 is a side cross-sectional view of a annulus filler element in accordance with the present invention.

As in the prior art configuration shown in FIG. 1, the arrangement shown in FIG. 2 comprises a blade 102 which is connected to a disc 104 at a radially outer face of the disc 104 by an interlocking configuration, such as a dovetail joint. A plurality of blades 102 are assembled onto the disc 104 around the circumference of the disc 104 to form a rotor.

An annulus filler element 40 according to the present invention is provided between adjacent blades 102 of the rotor. The annulus filler element 40 comprises a lid portion 42 having a radially outwardly facing surface which forms the inner wall of the flow annulus through the fan. The annulus filler element 40 is mounted to the disc by a pair of annulus filler hooks 108, 110 which engage with correspondingly shaped disc hooks 112, 114. The hook arrangement provides radial retention of the annulus filler element 40 against centrifugal loads experienced during operation of the rotor. A plurality of annulus filler elements 40 are provided between each pair of adjacent blades 102.

At a rearmost axial end, the annulus filler element 40 is provided with a tongue 133 which is received under a lip portion 134 of a rotating seal element 135.

Figure 3:
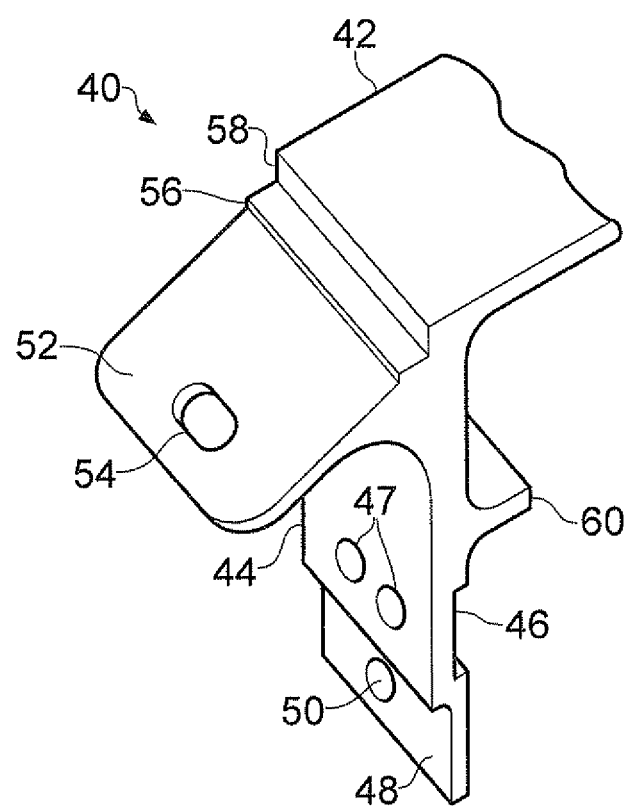
FIG. 3 is a perspective view of a portion of the annulus filler element of FIG. 2.

At a foremost axial end, the annulus filler element 40 has a flange 44 which extends radially inwardly from the lid portion 42, as shown in more detail in FIG. 3. The flange 44 has a reference recess 46 formed in its surface. The reference recess 46 is dimensioned to receive a complementarily shaped arm 118 of the disc 104 which interlocks with the reference recess 46. The flange 44 comprises two holes 47 which pass axially through the flange 44 in the location of the reference recess 46.

The flange 44 terminates at a radially innermost end with a balancing tang 48. The tang 48 has a hole 50 extending axially therethrough for receiving a bolt or other fixation means. Additionally, a protrusion 60 projects from an axially rearmost surface of the flange 44.

A nose cone support portion 52 projects from the lid portion 42 and the flange 44. The nose cone support portion 52 is adapted to receive a nose cone 122. Conventionally the nose cone 122 has a wall of substantially uniform thickness and thus an internal surface of the nose cone 122 is also conical. The nose cone support portion 122 therefore is angled relative to the flange 44 and also curved to correspond to the conical internal surface of the nose cone 122. A hole 54 passes through the nose cone support portion 52 and allows the nose cone 122 to be connected to the nose cone support portion 52.

A ridge 56 runs across the width of the nose cone support portion 52 on a radially upper surface of the nose cone support portion 52. The ridge 56 is positioned at or near where the nose cone support portion 52 meets with the flange 44 and lid portion 42. The ridge 56 mates with a correspondingly shape recess in the inner surface of the nose cone 122, as shown in FIG. 2.

When correctly located on the nose cone support portion 52, the nose cone 122 abuts with an end face 58 of the lid portion 42 and the nose cone 122 and radially outwardly facing surface of the lid portion 42 form a substantially continuous surface.

The annulus filler element 40 is of one-piece construction such that the lid portion 42, flange 44 and nose cone support portion 52 are all integrally formed with one another.

In use, the annulus filler element 40 is mounted to the disc 104 after the blades 102 have been assembled to the disc 104. The annulus filler element 40 is positioned such that the hooks 108, 110 of the annulus filler element are engaged with the hooks 112, 114 of the disc 104. In this position, the tongue 133 of the annulus filler element 40 is received under the lip 134 of the rotating seal element 135. Furthermore, an axial portion of an arm 118 of the disc 104 is received within the reference recess 46 of the flange 44. The axial portion of the arm 118 carries a dowel which is received in one of the holes 47 so as to fix the angular location of the annulus filler element 40. Alternatively, the configuration may be reversed wherein one of the holes 47 is replaced by a dowel which is received in a hole on the axial portion of the arm 118. The other of the holes 47 is used to bolt the flange 44 to the arm 118 and thus to provide axial retention of the annulus filler element 40.

When in this position, the protrusion 60 from the flange 44 contacts a slider assembly (not shown) which is located between the blade 102 and the disc 104 at the base of the interlocking configuration. The protrusion 60 therefore prevents the slider assembly from being withdrawn.

The nose cone 122 is located on the nose cone support portion 52 with the ridge 56 received in the recess of the nose cone 122 and the nose cone 122 abutting the end face 58 of the lid portion 42. When correctly located the holes 54 of the nose cone support portions 52 are aligned with holes in the nose cone 122 and the two can be bolted together.

A balancing weight may be attached to the balancing tang 48 if required to correctly balance the rotor when rotating. Alternatively, balancing of the rotor may be achieved by altering the weight of the bolts which connect the nose cone 122 to the nose cone support portion 52, for example by using longer or shorter bolts.

In the prior art example, the centrifugal loads experienced by the annulus filler were carried by the nose cone support ring 16. In the present invention the annulus filler elements 40 and thus nose cone support portions 52 are not connected to one another. However, the centrifugal loads created are instead carried by the nose cone 122. Utilising the nose cone 122 in this manner allows the removal of the nose cone support ring 16 and thus reduces the weight of the rotor and also reduces the assembly required.

The nose cone 122 may not always have a conical inner surface. For example, the internal surface of the nose cone 122 may have a number of flat axial slots which define a regular polygon. Consequently, the nose cone support portion 52 may be planar and run axially. However, in all configurations the nose cone support portion 52 will be correspondingly shaped to the portion of the inner surface to which it is connected.

The invention claimed is:

1. An annulus filler element for a rotor of a turbomachine, the annulus filler element mounted in use between adjacent blades of the rotor, the annulus filler element comprising:
    a lid portion having a radially outwardly facing surface which in use forms an inner wall of a flow annulus of the rotor between adjacent blades, the lid portion having an upstream end;
    a nose cone attachment portion extending in an upstream direction from the outwardly facing surface of the upstream end of the lid portion which in use is connected to a nose cone of the turbomachine; and
    a flange extending in a substantially radial direction from the upstream end of the lid portion which in use is connected to a disc of the rotor.

2. An annulus filler element as claimed in claim 1, wherein the nose cone support portion is conical.

3. An annulus filler element as claimed in claim 1, wherein the nose cone support portion is provided with a circumferential locating ridge operable to locate the nose cone in a radial position.

4. An annulus filler element as claimed in claim 1, wherein the flange comprises a reference recess operable to locate the annulus filler element in a radial and axial position with reference to a complementary portion of the disc.

5. An annulus filler element as claimed in claim 1, wherein the flange is connected to the disc.

6. An annulus filler element as claimed in claim 1, wherein the flange comprises a balance tang for attachment of a balancing weight.

7. An annulus filler element as claimed in claim 1, wherein the flange comprises a projection for retaining a slider of an adjacent blade.

8. A turbomachine comprising an annulus filler element as claimed in claim 1.

9. An annulus filler element as claimed in claim 1, wherein the annulus filler element is mounted in use between adjacent blades of the rotor by hooks on the annulus filler element engaging with corresponding hooks on the disc.

* * * * *